(12) United States Patent
Takebayashi et al.

(10) Patent No.: US 10,710,365 B2
(45) Date of Patent: *Jul. 14, 2020

(54) INK JET RECORDING METHOD AND INK JET RECORDING APPARATUS

(71) Applicant: CANON KABUSHIKI KAISHA, Tokyo (JP)

(72) Inventors: Satoshi Takebayashi, Tokyo (JP); Mamiko Kaji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,390

(22) Filed: Jul. 12, 2018

(65) Prior Publication Data

US 2019/0016129 A1 Jan. 17, 2019

(30) Foreign Application Priority Data

Jul. 13, 2017 (JP) .................................. 2017-136747
Jun. 14, 2018 (JP) .................................. 2018-113665

(51) Int. Cl.
*B41J 2/05* (2006.01)
*C09D 11/326* (2014.01)
(Continued)

(52) U.S. Cl.
CPC .............. *B41J 2/05* (2013.01); *B41J 2/14072* (2013.01); *B41J 2/14129* (2013.01); (Continued)

(58) Field of Classification Search
CPC ...... B41J 2/05; B41J 2/14072; B41J 2/14129; B41J 25/001; B41J 25/34; B41J 25/003; B41J 25/312; B41J 2/21; B41J 2025/008; B41J 2202/21; B41J 2/18; B41J 2/175; B41J 2202/03; C09D 11/38; C09D 11/10; C09D 11/106; C09D 11/322; C09D 11/326; C09D 11/107; C09D 11/30

See application file for complete search history.

(56) References Cited

U.S. PATENT DOCUMENTS 6,406,740 B1 * 6/2002 Komuro ............... B41J 2/14129
29/610.1
7,950,769 B2 5/2011 Sakai et al.
(Continued)

FOREIGN PATENT DOCUMENTS

JP 2008-105364 A 5/2008

*Primary Examiner* — Manish S Shah
(74) *Attorney, Agent, or Firm* — Venable LLP (57) ABSTRACT

Provided is an ink jet recording method capable of suppressing deterioration in an ejection property which occurs after a protection layer is eluted by an electrochemical reaction. The ink jet recording method includes using an ink jet recording apparatus having a recording head equipped with a heater, a first protection layer and a second protection layer made of a material such as iridium and a unit of causing an electrochemical reaction with the second protection layer as one of electrodes and an ink-mediated conduction site as the other electrode and ejecting the ink from the recording head to record an image on a recording medium, wherein the ink is an aqueous ink containing a pigment, a resin dispersant for dispersing the pigment and a specified chelating agent.

17 Claims, 4 Drawing Sheets

(51) Int. Cl.
- *C09D 11/322* (2014.01)
- *B41J 2/14* (2006.01)
- *C09D 11/38* (2014.01)
- *C09D 11/10* (2014.01)
- *C09D 11/106* (2014.01)

(52) U.S. Cl.
CPC ............ *C09D 11/10* (2013.01); *C09D 11/106* (2013.01); *C09D 11/322* (2013.01); *C09D 11/326* (2013.01); *C09D 11/38* (2013.01)

(56) References Cited

U.S. PATENT DOCUMENTS

| | | |
|---|---|---|
| 8,123,330 B2 | 2/2012 | Sakai et al. |
| 8,491,087 B2 | 7/2013 | Sakai et al. |
| 9,624,395 B2 | 4/2017 | Kaji et al. |
| 9,981,480 B2 | 5/2018 | Imai et al. |
| 2012/0105537 A1* | 5/2012 | Sakai ................. B41J 2/14072 347/22 |
| 2013/0187998 A1* | 7/2013 | Ohmoto ............... C09D 11/322 347/100 |
| 2014/0184702 A1* | 7/2014 | Ishida ................. B41J 2/14088 347/61 |
| 2015/0376413 A1* | 12/2015 | Higashi ................. B41J 2/2107 347/20 |
| 2017/0037267 A1 | 2/2017 | Takebayashi et al. |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, an ink jet recording method has come to be able to record images having definition and color developability as high as those achieved by silver halide photography or offset printing. Examples of a coloring material to be contained in an ink include dyes and pigments and from the standpoint of image fastness such as gas resistance, light resistance and water resistance, pigments have been used popularly.

In the ink jet recording method, there are, as a method of ejecting an ink from a recording head, a method making use of mechanical energy and a method making use of thermal energy. In a thermal method that makes use of the action of thermal energy for ejecting an ink from a recording head, a heater (electrothermal conversion element) of the recording head is exposed to high temperatures. In addition, the heater is influenced by both physical action such as impact at the time of cavitation caused by foaming of an ink or shrinkage of air bubbles and chemical action of an ink. A protection layer is therefore provided at the heater portion of an ink flow path in order to protect the heater from such action. As ink ejection is repeated and a component in an ink is heated at high temperatures, there occurs a phenomenon in which the component is converted into a hardly soluble or hardly dispersible substance and the resulting substance adheres to the surface of the protection layer. This substance is so-called "kogation". The kogation which has adhered to and deposited on the protection layer hinders thermal energy given to the heater from conducting to an ink sufficiently. As a result, thermal energy to be applied to the ink decreases, which adversely affects an ejection property. Deterioration in the ejection property thus generated becomes a cause of image unevenness.

In order to overcome such a problem, removal of kogation has so far been investigated. An ink jet recording apparatus is proposed which uses a metal such as iridium to be eluted by an electrochemical reaction as a material for forming an upper protection layer which is a surface layer portion of a protection layer (refer to Japanese Patent Application Laid-Open No. 2008-105364). This document discloses removal of kogation deposited on a heater portion by causing an electrochemical reaction with the upper protection layer as an electrode and eluting the upper protection layer.

SUMMARY OF THE INVENTION

As a result of investigation, the present inventors have confirmed that deterioration in the ejection property due to kogation can be suppressed temporarily by removing kogation with reference to the description of Japanese Patent Application Laid-Open No. 2008-105364, but have found that repetition of ink ejection after this removal causes deterioration in the ejection property at a relatively early stage and adversely affects images thus obtained.

An object of the invention is therefore to provide an ink jet recording method and an inkjet recording apparatus capable of suppressing deterioration in the ejection property that occurs after a protection layer is eluted by an electrochemical reaction.

The above-described object is achieved by the invention described below. The ink jet recording method of the invention is a method of using an ink jet recording apparatus having a recording head equipped with a heater placed in a ink flow path communicated with an ejection orifice, a first protection layer placed at a position corresponding to the heater and blocking a contact between the heater and an ink in the ink flow path and a second protection layer placed at a position corresponding to the heater and to be brought into contact with the ink and made of at least one metal material selected from the group consisting of iridium, ruthenium and a material containing at least either one of iridium and ruthenium and a unit of causing an electrochemical reaction with the second protection layer as one of electrodes and an ink-mediated conduction site as the other electrode to elute at least a portion of the second protection layer in the ink and ejecting the ink from the recording head to record an image on a recording medium. In this method, the ink is an aqueous ink containing a pigment, a resin dispersant for dispersing the pigment and a chelating agent which is at least either one of an alkanolamine having two or more hydroxy groups and a polyvalent carboxylic acid compound having two or more to four or less carboxy group.

The invention can provide an ink jet recording method and an ink jet recording apparatus capable of suppressing deterioration in the ejection property that occurs after the protection layer is eluted by an electrochemical reaction.

Further features of the present invention will become apparent from the following description of exemplary embodiments with reference to the attached drawings.

BRIEF DESCRIPTION OF THE DRAWINGS

FIG. 1A and FIG. 1B schematically show one example of the ink jet recording apparatus to be used in the ink jet recording method of the invention, in which

DESCRIPTION OF THE EMBODIMENTS

Preferred embodiments of the present invention will now be described in detail in accordance with the accompanying drawings.

The invention will hereinafter be described in further detail by a preferred embodiment. In the invention, when a compound is a salt, the salt in an ink is present while being dissociated into ions. For convenience sake, however, such a state is expressed by "the ink contains a salt". The term "ink for ink jet" may be simply called "ink". Physical property values are at normal temperature (25° C.) unless otherwise particularly specified.

As an ink jet recording method has come to be used for various purposes such as photographic printing or graphic art printing in recent years, recording of images with higher resolution and excellent gloss is demanded. Many of inks applicable to such purposes use so-called resin-dispersed pigments which adopt, as a pigment dispersing method, a method of dispersing a pigment with a resin dispersant. A pigment is essentially a hydrophobic substance so that a resin comprised of a hydrophobic unit and a hydrophilic unit is ordinarily used as a resin dispersant. The pigment which is hydrophobic can be dispersed in an aqueous medium by physical adsorption of the hydrophobic unit to the particle surface of the pigment and at the same time, hydration of the hydrophilic unit.

In the thermal method which ejects an ink from a recording head by the action of thermal energy, the recording head has a plurality of ejection orifices, an ink flow path communicated with the ejection orifices and a heater for generating thermal energy for ejecting the ink. An electrothermal conversion element as a heater has a heat element and an electrode for supplying it with electricity. Since the heater is covered with a protection layer having electrical insulation properties, insulation among respective heaters corresponding to ejection orifices is secured.

As described above, it has been found that when ink ejection is repeated after the protection layer to which kogation has adhered after repetition of ink ejection is subjected to the kogation removal step accompanied with elution of the protection layer caused by an electrochemical reaction as described in Japanese Patent Application Laid-Open No. 2008-105364, deterioration in the ejection property occurs in a relatively early stage. In other words, the number of ejection times until deterioration in the ejection property occurs after the kogation removal step is smaller than the cumulative number of ejection times until deterioration in the ejection property occurs due to kogation resulting from repetition of ink ejection before the kogation removal step. As a result of investigation, the present inventors have found that deterioration in the ejection property after the kogation removal step in which the protection layer is eluted in an ink by the electrochemical reaction peculiarly occurs when the ink contains a pigment dispersed by a resin. Based on the observation of a recording head having the ejection property deteriorated in such a manner under an optical microscope, they have found that in spite of the kogation removal step, kogation has occurred again and the kogation contains components derived from the pigment in the ink and the resin dispersant.

The present inventors have analyzed the cause of such a phenomenon. The cause will hereinafter be described using iridium as an example of a material for forming the protection layer for convenience sake, but this similarly applies to the protection layer made of ruthenium or an alloy of such a metal.

During elution of the protection layer in an ink by an electrochemical reaction, iridium which has constituted the protection layer changes into an iridium ion. In an aqueous medium constituting an aqueous ink, the existing state of the iridium ion is not so stable so that, after elution once, it changes into iridium oxide and thus becomes insoluble. Although iridium oxide is an insolubilized solid, has a certain degree of hydrophilicity because of polarization of an oxygen atom into $\delta^-$. On the other hand, the pigment has an essentially hydrophobic particle surface and it also has a hydrophilic site. The hydrophilic site not only has weak interaction with the hydrophobic unit of the resin (resin dispersant) used for dispersing the pigment but also easily attracts hydrophilic iridium oxide.

In the ink containing a resin-dispersed pigment, the resin as a resin dispersant is in equilibrium between adsorption to the particle surface of the pigment and desorption from the particle surface of the pigment and the dispersion state is kept stable by this equilibrium. This means that the resin repeats adsorption and desorption to and from the particle surface of the pigment. Application of ejection energy to the ink under such a state facilitates desorption of the resin dispersant from the hydrophilicity-having site of the particle surface of the pigment and at the same time, facilitates adsorption of iridium oxide instead to prevent adsorption of the resin dispersant. The resin dispersant therefore cannot be adsorbed to the particle surface of the pigment which is originally expected to have a stabilized dispersion state by the adsorption of the resin dispersant and the pigment becomes unstable from the standpoint of surface energy. Application of thermal energy to the ink under such a state facilitates change of the pigment having an unstable dispersion state and the resin dispersant which has lost an adsorption target into kogation and then accumulation of kogation. This is presumed to lead to deterioration in the ejection property.

It has also been revealed that the above-described deterioration in the ejection property does not when the coloring material is a self-dispersible pigment or a dye. This is presumed because the dispersion state of the self-dispersible pigment or the dye, different from that of the resin-dispersed pigment, does not become unstable due to adsorption/desorption of the resin.

Considering that deterioration in the ejection property which occurs after elution of the protection layer can be suppressed by suppressing unstabilization of the dispersion state of the resin-dispersed pigment, the present inventors made various investigations on the constituent of an ink. As a result, they have found that incorporation of a specified chelating agent can suppress deterioration in the ejection property which occurs after elution of the protection layer. More specifically, at least any of chelating agents selected from the group consisting of an alkanolamine having two or more hydroxy groups and a polyvalent carboxylic acid compound having two or more to four or less carboxy group.

The present inventors have presumed, as follows, the reason why such a chelating agent is effective for suppressing deterioration in the ejection property which occurs after elution of the protection layer. In the following description, an iridium ion or ruthenium ion (which may hereinafter be called "metal ion") has a property of easily forming a complex, mainly a six-coordinated one, in an aqueous liquid medium.

First, the alkanolamine having two or more hydroxy groups is a compound obtained by substituting the saturated hydrocarbon chain constituting an alkylamine by a hydroxy group and this hydroxy group easily forms a complex because of having affinity for a metal ion. Further, the alkanolamine has two or more hydroxy groups, meaning that it has a plurality of sites which can be coordinated to a metal ion and therefore it has high affinity for the metal ion. The alkanolamine therefore efficiently traps a metal ion eluted in an ink by an electrochemical reaction and forms a stable complex. This hinders formation of a metal oxide and can suppress deterioration in the ejection property which occurs after elution of the protection layer.

Next, the polyvalent carboxylic acid compound having two or more to four or less carboxy group is a compound obtained by substituting the hydrocarbon chain with two to four carboxy groups (carboxylic acid groups) and the carboxy groups tend to be present in an ink as an ion dissociated state. The ion-dissociated carboxy groups, similar to the hydroxy groups of the alkanolamine, tend to form a complex having affinity for a metal ion. The polyvalent carboxylic acid compound having two or more to four or less carboxy group therefore can efficiently trap a metal ion eluted in an ink by an electrochemical reaction and form a stable complex. This hinders formation of a metal oxide and can suppress deterioration in the ejection property which occurs after elution of the protection layer.

Alkanolamines, such as monoethanolamine, having only one hydroxy group, monovalent carboxylic acid compounds, such as acetic acid, having only one carboxy group, and polyvalent carboxylic acid compounds having five or more carboxy group cannot form a stable complex so that they cannot suppress deterioration in the ejection property.

<Ink Jet Recording Method, Ink Jet Recording Apparatus>

The ink jet recording method of the invention is a method of recording an image on a recording medium by ejecting an aqueous ink from an ink jet system recording head. It makes use of, as an ink ejection method, a method of applying thermal energy to an ink.

Figure 1A:
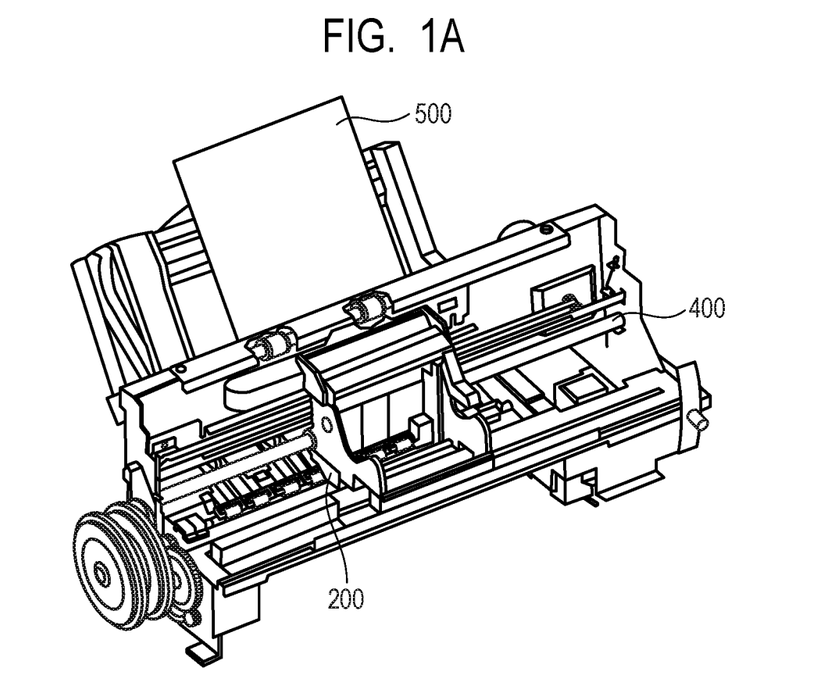
FIG. 1A is a perspective view of the major portion of the ink jet recording apparatus and FIG. 1B is a perspective view of a head cartridge.
Figure 1B:
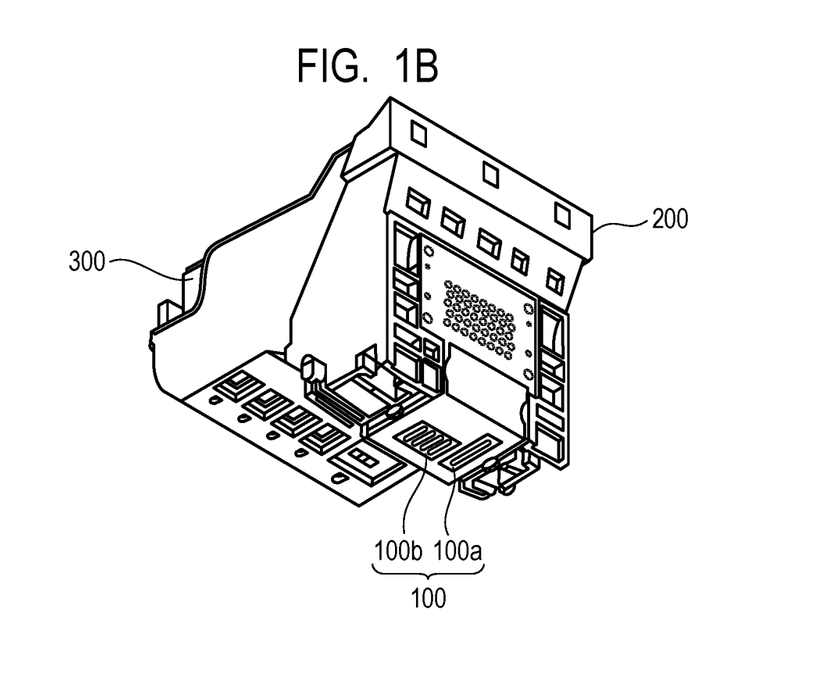

FIG. 1A and FIG. 1B each schematically show one example of the ink jet recording apparatus used in the ink jet recording method of the invention. FIG. 1A is a perspective view of the major portion of the ink jet recording apparatus and FIG. 1B is a perspective view of a head cartridge. The ink jet recording apparatus is equipped with a conveyance unit (not shown) for conveying a recording medium 500 and a carriage shaft 400. On the carriage shaft 400, a head cartridge 200 can be mounted. The head cartridge 200 is equipped with a recording head 100 (100a and 100b) and is constituted to permit an ink cartridge 300 to be set thereon. During conveyance of the head cartridge 200 in a main scanning direction along the carriage shaft 400, an ink (not shown) is ejected from the recording head 100 (100a and 100b) to the recording medium 500. The recording medium 500 is then conveyed in a sub-scanning direction by means of the conveyance unit (not shown) and thus, an image is recorded on the recording medium 500.

(Recording Head)
(Recording Element Substrate)

Figure 2:
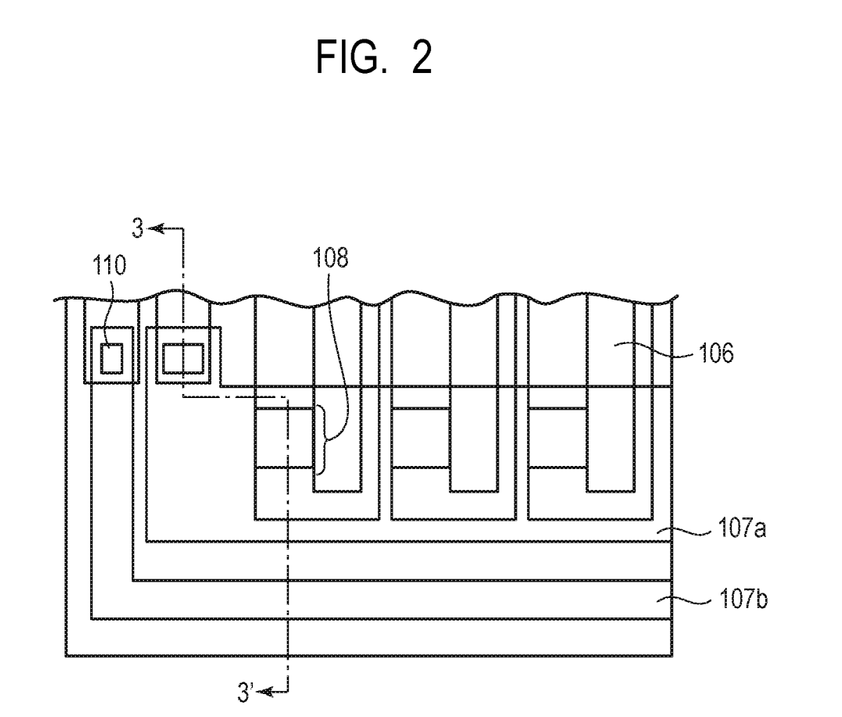
FIG. 2 is a plan view schematically showing the vicinity of a heater of a recording element substrate.
Figure 3:
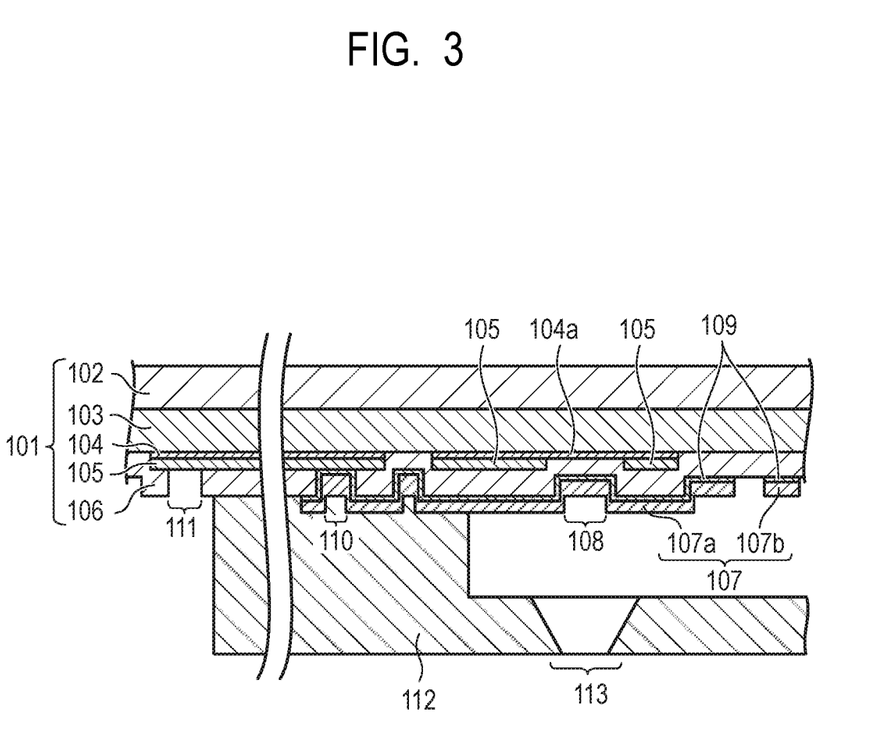
FIG. 3 is a cross-sectional view schematically showing the recording element substrate cut vertically along the line 3-3' of FIG. 2.

FIG. 2 is a plan view schematically showing the vicinity of a heater of a recording element substrate. FIG. 3 is a cross-sectional view schematically showing the recording element substrate cut vertically along the line 3-3' of FIG. 2.

The constitution of a recording element substrate 101 of the recording head 100 will be described. The recording element substrate 101 is composed of a silicon substrate body 102, a heat storage layer 103, a heat generating resistor layer 104 and an electric wiring layer 105. The heat storage layer 103 is made of a material such as a thermal oxide film of silicon, a silicon oxide film, a silicon nitride film or the like. The electric wiring layer 105 is a wiring made of a metal material such as aluminum, aluminum-silicon, aluminum-copper or the like. A heat generating portion 104a as a heater (electrothermal conversion element) is formed by removing a portion of the electric wiring layer 105 to form a gap and exposing the heat generating resistor layer 104 from the gap. The electric wiring layer 105 is connected to a drive element circuit (not shown) or external power terminal (not shown) and supplied with electricity from the outside. In the example shown in the drawing, the electric wiring layer 105 is placed as a layer adjacent to the heat generating resistor layer 104. The constitution of the recording element substrate is not limited to the above-described one but it may have a constitution obtained by forming the electric wiring layer 105 as a layer adjacent to the silicon substrate body 102 or the heat storage layer 103, removing a portion of the layer as a gap and placing the heat generating resistor layer 104 thereon.

A first protection layer 106 is made of a material such as silicon oxide or silicon nitride and is provided adjacent to the heat generating portion 104a and the heat generating resistor layer 104 while partially having the electric wiring layer 105 therebetween. The first protection layer 106 functions as an insulating layer for blocking the contact between the heat generating portion 104a and the ink in the ink flow path.

A second protection layer 107 is an outermost layer to be brought into contact with the ink in the ink flow path. A region of the second protection layer 107 located on the side of the ink flow path of the heat generating portion 104a and at the same time, causes the heat generated at the heat generating portion 104a to act on the ink corresponds to a heater 108. The second protection layer 107 has a function of protecting the heater 108 from chemical impact or physical impact (cavitation) caused by the heat generation at the heat generating portion 104a and at the same time, at least a portion of the second protection layer elutes when an electrochemical reaction is caused for removal of kogation. The second protection layer 107 made of at least one metal material selected from the group consisting iridium, ruthenium and a material containing at least either one of iridium and ruthenium is used in order to satisfy both of these properties.

Figure 4A:
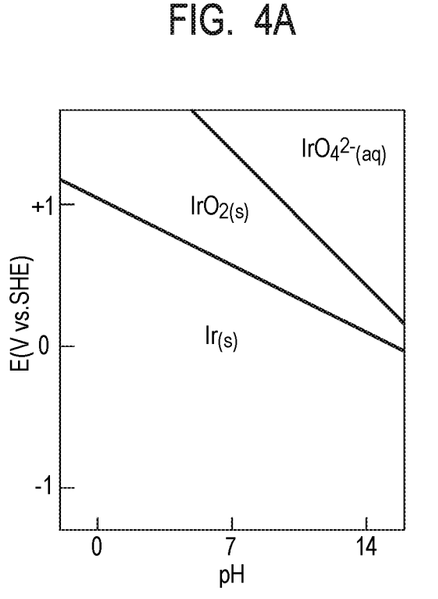
FIG. 4A is a (potential of iridium)-pH graph.
Figure 4B:
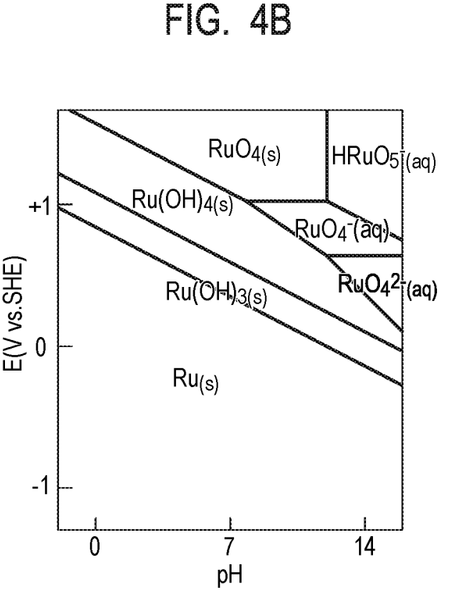
FIG. 4B is a (potential of ruthenium)-pH graph.
Figure 4C:
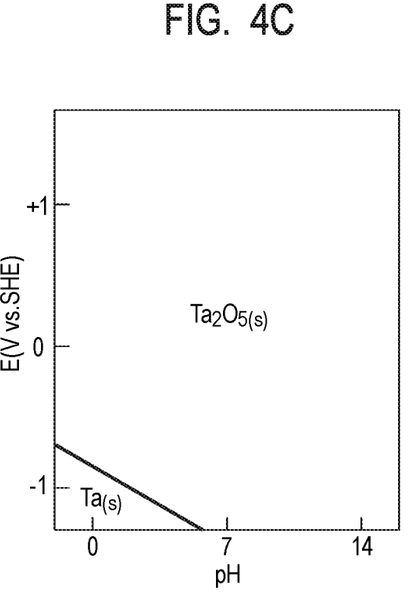
FIG. 4C is a (potential of tantalum)-pH graph.

The elution of a metal material by an electrochemical reaction can be grasped by "potential-pH graph". FIG. 4A is a (potential of iridium)-pH graph. FIG. 4B is a (potential of ruthenium)-pH graph. FIG. 4C is a (potential of tantalum)-pH graph. As is apparent from the presence of an $IrO_4^{2-}$ (aq) region in FIG. 4A, when a positive potential is applied from the outside with iridium as an anode, iridium is ionized and eluted in an aqueous medium. In short, a corrosion area appears as a result of dissolution in an ink. It can be understood from FIG. 4B that ruthenium has a property similar to that of iridium. When a voltage applied is too high in a typical pH range of an aqueous ink (neutral to alkaline), however, ruthenium may become an oxide (solid) so that the voltage should be adjusted in consideration of this point. When application of a somewhat high voltage is required, however, iridium is preferably selected. On the other hand, it can be understood from FIG. 4C that tantalum conventionally used popularly as a protection layer of a heater becomes an oxide (solid) in a typical pH range of an aqueous ink, not depending on the voltage. This means that a corrosion area due to dissolution in an ink does not exist. It is therefore difficult to remove kogation by an electrochemical reaction even if tantalum is used as a formation material of the second protection layer 107.

Because of the above-described reason, the second protection layer should be made of a specified metal material in order to have a corrosion area in a typical pH range of an aqueous ink in the potential-pH graph and to prevent formation of a strong oxide film even by heating. As the metal material, at least one metal material selected from the group consisting of iridium, ruthenium and a material containing at least either one of iridium and ruthenium is therefore used. Examples of the material containing at least either one of iridium and ruthenium include alloys of such a metal with the other metal. The greater the content of iridium or ruthenium in the alloy, the electrochemical reaction is less inhibited by the formation of an oxide film. Preferably, not an alloy but iridium or ruthenium is used. Further, iridium is more preferably used because although the surface of the second protection layer is heated to from about 300° C. to 600° C. by heating with the heater 108, iridium does not form an oxide film up to 800° C. even in the atmosphere, that is, an oxygen-richer condition than in the ink.

At least one metal material used as the second protection layer 107 and selected from the group consisting of iridium, ruthenium and a material containing at least either one of iridium and ruthenium has poor adhesion properties. An adhesion layer 109 is therefore placed between the first protection layer 106 and the second protection layer 107 to improve the adhesion of the second protection layer 107 to the first protection layer 106. The adhesion layer 109 is made of an electroconductive material.

The second protection layer 107 is inserted through a through-hole 110 and is electrically connected to the electric wiring layer 105 via the adhesion layer 109. The electric wiring layer 105 extends to the end portion of the recording element substrate 101 and the tip of it becomes an external electrode 111 for electrical connection to the outside.

The recording element substrate 101 having the above-described constitution is joined with a flow path forming member 112. The flow path forming member 112 has an ejection orfice 113 at a position corresponding to the heater 108 and at the same time, it forms an ink flow path starting from an ink supply port (not shown) provided so as to penetrate the recording element substrate 101, passing the heater 108 and communicated with the ejection orifice 113.

[Electrochemical Reaction]

A method of causing the electrochemical reaction at the recording head will next be described. The second protection layer 107 is composed of two regions, that is, a region (heater-side region) 107a including the heater 108 formed at a position corresponding to the heat generating portion 104a and the other region (opposite electrode-side region) 107b. Electrical connection is provided to each of these regions. When the ink flow path has no ink therein, no electrical connection exists between the heater-side region 107a and the opposite electrode-side region 107b. However, the ink usually has therein electrolytes. When the ink flow path is filled with the ink, therefore, the heater-side region 107a and the opposite electrode-side region 107b as an ink-mediated conduction site have electrically conducted with each other via the ink. Under such a state, a voltage is applied with the heater-side region 107a as one of the electrodes and the opposite electrode-side region 107b as the other electrode. Then, an electrochemical reaction occurs at the interface between the second protection layer 107 and the ink. A specified metal material is used as a material forming the second protection layer 107 so that application of a voltage in the presence of an ink causes an electrochemical reaction and at least a portion of the second protection layer 107 is eluted. As is apparent from FIG. 4A and FIG. 4B, elution of a metal occurs on the side of the anode. For removal of kogation which has adhered to the heater 108, therefore, it is only necessary to apply a voltage so that the heater-side region 107a becomes an anode and the opposite electrode-side region 107b becomes a cathode. In other words, a voltage is applied by connecting the anode and cathode of a power source to the heater-side region 107a and the opposite electrode-side region 107b, respectively.

<Aqueous Ink>

The ink used in the ink jet recording method and ink jet recording apparatus in the invention is an aqueous ink for ink jet recording containing a pigment, a resin dispersant for dispersing the pigment and a specified chelating agent. Components constituting the ink and physical properties of the ink will hereinafter be described.

(Coloring Material)

The coloring material to be incorporated in the ink is a pigment. The pigment is a so-called "resin-dispersed pigment" using a resin dispersant for dispersing the pigment. The resin as the resin dispersant preferably disperses the pigment in an aqueous medium while being adsorbed physically to the particle surface of the pigment. The resin is not required to be chemically bonded to the particle surface of the pigment. The content of the pigment in the ink is preferably 0.50% by mass or more to 15.00% by mass or less, more preferably 1.00% by mass or more to 10.00% by mass or less, each based on the total mass of the ink.

Specific examples of the pigments include inorganic pigments such as carbon black and titanium oxide and organic pigments such as azo, phthalocyanine, quinacridone, isoindolinone, imidazolone, diketopyrrolopyrrole and dioxazine.

As the resin dispersant, a resin having an anionic group capable of dispersing a pigment in an aqueous medium by the action of the anionic group are preferred. The resin having the anionic group is excellent in the effect of suppressing deterioration in the ejection property which occurs after elution of the protection layer. This excellence is presumed to be brought about by the action of the anionic group on an iridium ion or ruthenium ion to retard the formation reaction of a metal oxide. As the resin dispersant, resins described later are preferred, with water-soluble resins being more preferred. A mass ratio of the content (% by mass) of the pigment to the content of the resin dispersant (pigment/resin dispersant) is preferably 0.3 or more to 10.0 or less.

(Resin)

The ink may contain a resin. The content (% by mass) of the resin in the ink is preferably 0.10% by mass or more to 20.00% by mass or less, more preferably 0.50% by mass or more to 15.00% by mass or less, each based on the total mass of the ink.

The resin can be incorporated in the ink for the purpose of (i) stabilizing the dispersion state of the pigment, that is, serving as the above-described resin dispersant or an auxiliary agent thereof, (ii) improving various properties of an image to be recorded, and the like. Examples of the form of the resin include block copolymers, random copolymers and graft copolymers, and combinations thereof. The resin may be dissolved as a water-soluble resin in an aqueous medium or dispersed as a resin particle in an aqueous medium. The resin particle does not necessarily enclose the coloring material therein.

In the invention, when the resin is water-soluble, it means that by neutralization of the resin with an alkali equimolar to the acid value of the resin, the resin does not form a particle having a particle size measurable by dynamic light scattering. Whether the resin is water-soluble or not can be determined by the following method. First, a liquid containing a resin (resin solid content: 10% by mass) neutralized with an alkali (sodium hydroxide, potassium hydroxide, or the like) equivalent to its acid value is prepared. Then, the liquid thus prepared is diluted to 10 times (based on volume) with pure water to prepare a sample solution. The particle size of the resin in the sample solution is measured by dynamic light scattering. If a particle with a particle size are not measured, the resin can be determined as water-soluble. The measurement conditions at this time can be set, for example, as follows: SetZero: 30 seconds, measurement times: 3, and measurement time: 180 seconds. As a particle size distribution analyzers, a dynamic light scattering particle size analyzer (for example, "UPA-EX150"; product of NIKKISO) can be used. It is needless to say that the particle size distribution analyzer and measurement conditions are not always limited to the above-described ones.

The resin, when it is a water-soluble resin, has preferably an acid value of 100 mgKOH/g or more to 250 mgKOH/g or less while the resin in the form of resin particles has preferably an acid value of 5 mgKOH/g or more to 100 mgKOH/g or less. The weight average molecular weight of the resin, when it is a water-soluble resin, is preferably 3,000 or more to 15,000 or less, while that of the resin particle is preferably 1,000 or more to 2,000,000 or less. The volume-based particle size of the resin particle as measured by dynamic light scattering (under measurement conditions similar to those described above) is preferably 50 nm or more to 500 nm or less.

Examples of the resin include acrylic resins, urethane resins and olefin-based resins. Of these, acrylic resins and urethane resins are preferred.

As acrylic resins, those having a hydrophilic unit and a hydrophobic unit as a constitution unit are preferred. Of these, resins having a hydrophilic unit derived from (meth)acrylic acid and a hydrophobic unit derived from at least one of an aromatic ring-containing monomer and a (meth)acrylate-based monomer are preferred. Particularly preferred are resins having a hydrophilic unit derived from (meth)acrylic acid and a hydrophobic unit derived from at least one of styrene and α-methylstyrene monomers. These resins easily cause interaction with the pigment so that they can preferably be used as a resin dispersant for dispersing the pigment.

The hydrophilic unit is a unit having a hydrophilic group such as anionic group. The hydrophilic unit can be formed, for example, by polymerizing a hydrophilic monomer having a hydrophilic group. Specific examples of the hydrophilic monomer having a hydrophilic group include acidic monomers having a carboxylic acid group such as (meth)acrylic acid, itaconic acid, maleic acid or fumaric acid and anionic monomers such as anhydrides or salts of these acidic monomers. Examples of a cation constituting the salt of the acidic monomer include ions such as lithium, sodium, potassium, ammonium, and organic ammonium. The hydrophobic unit is a unit not having a hydrophilic group such as anionic group. The hydrophobic unit can be obtained by polymerizing a hydrophobic monomer not having a hydrophilic group such as anionic group. Specific examples of the hydrophobic monomer include aromatic ring-containing monomers such as styrene, α-methylstyrene and benzyl (meth)acrylate and (meth)acrylate-based monomers such as methyl (meth)acrylate, butyl (meth)acrylate and 2-ethylhexyl (meth)acrylate.

As the urethane resin, for example, that obtained by reacting a polyisocyanate with a polyol can be used. It may be obtained by reacting, in addition to them, with a chain extending agent. Examples of the polyolefin-based resin include polyethylene and polypropylene.

(Chelating Agent)

The ink contains, as a chelating agent, at least either one of an alkanolamine having two or more hydroxy groups and a polyvalent carboxylic acid compound having two or more to four or less carboxy group. The content (% by mass) of the chelating agent in the ink is preferably 0.01% by mass or more based on the total mass of the ink. The content less than 0.01% by mass may fail to sufficiently suppress deterioration in the ejection property which occurs after elution of the protection layer because an amount of the chelating agent is too small from the standpoint of the balance with the protection layer to be eluted. The content (% by mass) of the chelating agent in the ink is preferably 2.00% by mass or less, more preferably 1.00% by mass or less, each based on the total mass of the ink.

Preferred specific examples of the chelating agent will be described later but in the invention, use of an alkanolamine having two or more hydroxy groups is preferred. Formation of iridium oxide or ruthenium oxide slightly reduces the pH of the ink. At this time, when a polyvalent carboxylic acid compound having two or more to four or less carboxy group is used as the chelating agent, the number of carboxy groups in dissociated ion form decreases due to the lowering of pH and this sometimes results in slight reduction in metal ion trapping efficiency. On the other hand, the alkanolamine having two or more hydroxy group is less influenced by the lowering of pH and is therefore preferred because its metal ion trapping action does not depend on ion dissociation.

[Alkanolamine Having Two or More Hydroxy Groups]

Examples of the alkanolamine having two or more hydroxy groups include compounds represented by $N(H)_x(R\text{—}OH)_y$, in which R represents an alkylene group, x stands for 0 or 1, y stands for 2 or 3, and x+y is 3. The alkylene group as R has preferably from 1 to 5 carbon atoms, more preferably 1 to 3 carbon atoms.

Examples of the alkanolamine having two or more hydroxy groups include dialkanolamines such as diethanolamine and trialkanolamines such as triethanolamine and tripropanolamine. Of these, use of a trialkanolamine such as triethanolamine and tripropanolamine is preferred. Trialkanolamine can trap a metal ion particularly efficiently because it has, in a molecule thereof, three hydroxy groups. Of these, triethanolamine and tripropanolamine are particularly preferred. These compounds have a proper hydrocarbon chain (alkylene group) length so that they easily form a stable complex with an iridium ion or ruthenium ion and deterioration in the ejection property which occurs after elution of the protection layer can be suppressed more effectively. The trialkanolamine content (% by mass) in the ink is preferably 0.20% by mass or more to 1.00% by mass or less based on the total mass of the ink. The content less than 0.20% by mass may fail to sufficiently suppress deterioration in the ejection property which occurs after elution of the protection layer because an amount of the chelating agent is too small from the standpoint of the balance with the protection layer to be eluted. On the other hand, the content (% by mass) more than 1.00% by mass may not sufficiently suppress deterioration in the ejection property which occurs after elution of the protection layer because interaction between molecules of the trialkanolamine is likely to become strong, making it difficult to trap an iridium ion or ruthenium ion.

[Polyvalent Carboxylic Acid Compound Having Two or More to Four or Less Carboxy Group]

Examples of the polyvalent carboxylic acid compound having two or more to four or less carboxy group include dicarboxylic acid compounds such as oxalic acid, malonic acid, succinic acid, glutaric acid, adipic acid, maleic acid, fumaric acid, itaconic acid, sebacic acid, phthalic acid, isophthalic acid, terephthalic acid, malic acid and tartaric acid, and salts and hydrogen salts thereof, tricarboxylic acid compounds such as citric acid and trimellitic acid, and salts and hydrogen salts thereof; and tetracarboxylic acid compounds such as ethylenediaminetetracarboxylic acid (EDTA) and pyromellitic acid, and salts and hydrogen salts thereof. Of these, hydroxycarboxylic acid compounds (having two to four carboxylic acid groups) such as citric acid and divalent or trivalent carboxylic acid compounds are preferred. Examples of a cation forming a salt include a cation of an alkali metal such as lithium, sodium or potassium, ammonium ion, and organic ammonium ion. As the polyvalent carboxylic acid compound having two or more to four or less carboxy group, that having a molecular weight of 50 or more to 500 or less is preferably used. Polyvalent carboxylic acid compounds, such as aspartic acid and glutamic acid, having a nitrogen atom (such as nitrogen atom of an amino group or imino group) which will be a cation forms an intermolecular salt so that they may have slightly reduced metal ion trapping efficiency.

(Aqueous Medium)

The ink may contain water or an aqueous medium which is a mixed solvent of water and a water-soluble organic solvent. The water is preferably deionized water or ion exchanged water. The content (% by mass) of the water in the ink is preferably 50.00% by mass or more to 95.00% by mass or less based on the total mass of the ink. The content (% by mass) of the water-soluble organic solvent in the ink is preferably 3.00% by mass or more to 50.00% by mass or less based on the total mass of the ink. As the water-soluble organic solvent, any of those usable for ink jet inks such as alcohols, (poly)alkylene glycols, glycol ethers, nitrogen-containing compounds, and sulfur-containing compounds can be used.

(Surfactant)

The ink preferably contains a surfactant. There are various surfactants such as cationic, anionic, amphoteric, and nonionic surfactants. Of these, nonionic surfactants are preferred because the effect on the ejection property can be easily obtained. The nonionic surfactant is orientated to insolubilized iridium oxide or ruthenium oxide and stabilizes its dispersion. The surfactant suppresses action of iridium oxide or ruthenium oxide on a hydrophilicity-having site of the particle surface of the pigment and the dispersion state of the pigment is kept stable. Deterioration in the ejection property which occurs after elution of the protection layer can therefore be suppressed more effectively. The content (% by mass) of the surfactant in the ink is preferably 0.05% by mass or more to 1.00% by mass or less based on the total mass of the ink.

Of the nonionic surfactants, particularly fluorine-based nonionic surfactants have strong orientation force to insolubilized iridium oxide or ruthenium oxide and are highly effective for stabilizing these oxides. Using a fluorine-based nonionic surfactant therefore can particularly effectively suppress deterioration in the ejection property which occurs after elution of the protection layer. The content (% by mass) of the fluorine-based nonionic surfactant in the ink is preferably 0.05% by mass or more to 0.40% by mass or less based on the total mass of the ink. The content less than 0.05% by mass may fail to sufficiently suppress deterioration in the ejection property which occurs after elution of the protection layer because the content of the fluorine-based nonionic surfactant is too small from the standpoint of the balance with the protection layer to be eluted. On the other hand, the content more than 0.40% by mass may fail to sufficiently suppress deterioration in the ejection property which occurs after elution of the protection layer because the interaction between the fluorine-based surfactants becomes strong and the number of molecules oriented to the insolubilized iridium oxide or ruthenium oxide decreases.

(Other Additives)

The ink may contain, in addition to the above-described components, various additives such as anti-foaming agent, pH regulator, viscosity modifier, rust preventive, antiseptic agent, mildew proofing agent, antioxidant and reduction preventive as needed.

(Physical Properties of Ink)

The above-described ink is an aqueous ink suited for an ink jet system. From the standpoint of reliability, proper control of its physical property values is desired. Described specifically, the surface tension at 25° C. of the ink is preferably 20 mN/m or more to 60 mN/m or less. The viscosity at 25° C. of the ink is preferably 1.0 mPa·s or more to 10.0 mPa·s or less. The pH at 25° C. of the ink is 7.0 or more to 9.5 or less, more preferably 8.0 or more to 9.5 or less.

EXAMPLES

The invention will hereinafter be described in further detail by Examples and Comparative Examples. The invention is not limited by the following Examples insofar as it does not depart from the gist of the invention. With respect to the amount of components, all designations of "part" or "parts" and "%" are on a mass basis unless otherwise particularly indicated.

<Preparation of Pigment Dispersion Liquid>

(Pigment Dispersion Liquid 1)

A styrene-ethyl acrylate-acrylic acid copolymer having an acid value of 150 mgKOH/g and a weight average molecular weight of 8,000 (Resin 1) was prepared. An aqueous solution of Resin 1 having a resin content (solid content) of 20.0% was prepared by neutralizing 20.0 parts of Resin 1 with potassium hydroxide in an amount equimolar to the acid value and adding an adequate amount of pure water. A mixture was obtained by mixing 20.0 parts of a pigment (C.I. Pigment Red 122), 50.0 parts of the aqueous solution of Resin 1 and 30.0 parts of ion exchanged water. The resulting mixture was subjected to 50-pass dispersing treatment using Nanomizer (product of Yoshida Kikai Co.) under a pressure of 150 MPa. Then, the dispersion thus obtained was centrifuged for 30 minutes at a rotation speed of 5,000 rpm to remove crude particles. The residue was then pressure filtered through a cellulose acetate filter having a pore size of 3.0 μm (product of Advantec) to obtain Pigment dispersion liquid 1 having a pigment content of 20.0% and a resin dispersant (Resin 1) content of 10.0%.

(Pigment Dispersion Liquid 2)

In a manner similar to that used for the preparation of Pigment dispersion liquid 1 except that the pigment was changed to carbon black, Pigment dispersion liquid 2 having a pigment content of 20.0% and a resin dispersant content of 10.0% was prepared.

(Pigment Dispersion Liquid 3)

In a manner similar to that used for the preparation of Pigment dispersion liquid 1 except that the pigment was changed to C.I. Pigment Blue 15:3, Pigment dispersion liquid 3 having a pigment content of 20.0% and a resin dispersant content of 10.0% was prepared.

(Pigment dispersion liquid 4)

In a manner similar to that used for the preparation of Pigment dispersion liquid 1 except that the pigment was changed to C.I. Pigment Yellow 74, Pigment dispersion liquid 4 having a pigment content of 20.0% and a resin dispersant content of 10.0% was prepared.

(Pigment dispersion liquid 5)

A benzyl methacrylate-methacrylic acid copolymer having an acid value of 150 mgKOH/g and a weight average molecular weight of 8,000 (Resin 2) was prepared. In a manner similar to that used for the preparation of Pigment dispersion liquid 1 except that Resin 1 was replaced by Resin 2, Pigment dispersion liquid 5 having a pigment content of 20.0% and a resin dispersant content of 10.0% was prepared.

(Pigment dispersion liquid 6)

A four-necked flask equipped with a stirrer, a nitrogen inlet tube, a reflux condenser and a thermometer was charged with 100.0 parts of ethylene glycol monobutyl ether. A monomer mixture was obtained by mixing 80.0 parts of styrene and 20.0 parts of polyethylene glycol (20.0 mol addition) acrylate. After the flask was purged with nitrogen and heated to 110° C., the monomer mixture and 1.3 parts of t-butyl peroxide (polymerization initiator) were added dropwise to the flask for 3 hours under stirring. Then, aging was performed for 2 hours and the ethylene glycol monobutyl ether was removed under reduced pressure to obtain Resin 3. Resin 3 is a random copolymer without an ionic group. An adequate amount of pure water was added to 20.0 parts of Resin 3 to dissolve the latter in the former at 80° C. to obtain an aqueous solution of Resin 3 having a resin content (solid content) of 20.0%. In a manner similar to that used for the preparation of Pigment dispersion liquid 1 except that the aqueous solution of Resin 1 was replaced by the aqueous solution of Resin 3, Pigment dispersion liquid 6 having a pigment content of 20.0% and a resin dispersant content of 10.0% was prepared.

(Pigment Dispersion Liquid 7)

A solution obtained by dissolving 5.0 g of concentrated hydrochloric acid in 5.5 g of water was cooled to 5° C. and 1.5 g of 4-aminophthalic acid was added to the solution. A vessel containing the solution was placed in an ice bath and while stirring and keeping the temperature of the solution at 10° C. or less, a solution obtained by dissolving 11.8 g of sodium nitrite in 9.0 g of ion exchanged water of 5° C. was added. After stirring for 15 minutes, 6.0 g of carbon black was added under stirring. Stirring was performed for further 15 minutes to obtain a slurry. The slurry thus obtained was filtered through a filter paper ("Standard filter paper No. 2, product of Advantec). The particles were washed with water sufficiently and then dried in an oven of 110° C. Then, the sodium ion was substituted by a potassium ion by an ion exchange method to obtain a self-dispersible pigment having a $—C_6H_3—(COOK)_2$ group-bonded particle surface. An adequate amount of pure water was added to adjust the pigment content and Pigment dispersion liquid 7 having a pigment content of 20.0% was obtained.

<Surfactant>

Properties of the surfactants used for the preparation of the reaction liquid are shown in Table 1.

TABLE 1

| | Properties of surfactant | |
|---|---|---|
| Surfactant | Name | Trade name, etc. |
| 1 | Perfluoroalkyl ethylene oxide adduct | Zonyl FS-3100, product of Chemours |
| 2 | Perfluoroalkyl ethylene oxide adduct | Megaface F-444, product of DIC |
| 3 | Perfluoroalkyl ethylene oxide adduct | Zonyl FSO-100, product of Chemours |
| 4 | Perfluoroalkyl carboxylate | Megaface F-114, product of DIC |
| 5 | Silicone-based nonionic surfactant | BYK333, product of BYK |
| 6 | Acetylene glycol ethylene oxide adduct | Acetylenol E100, Kawaken Fine Chemicals |
| 7 | Na dodecyl sulfate | |

<Preparation of Inks>

After the components (unit: %) shown in the upper columns of Table 2 or 3 were mixed and stirred sufficiently, the resulting mixture was pressure filtered through a cellulose acetate filter having a pore size of 3.0 μm (product of Advantec) to prepare an ink. Proxel GXL(S) is an antiseptic agent produced by Lonza. In the lower columns of Tables 2 and 3, a chelating agent content (expressed as "chelating agent (%)"), a trialkanolamine content (expressed as "trialkanolamine (%)") and a fluorine-based nonionic surfactant content (expressed as "specified surfactant (%)").

TABLE 2

| | Composition and properties of ink | | | | | | | | | | | | | | | | | |
|---|---|---|---|---|---|---|---|---|---|---|---|---|---|---|---|---|---|---|
| | Ink | | | | | | | | | | | | | | | | | |
| | 1 | 2 | 3 | 4 | 5 | 6 | 7 | 8 | 9 | 10 | 11 | 12 | 13 | 14 | 15 | 16 | 17 | 18 |
| Pigment dispersion liquid 1 | 25.00 | | | | 25.00 | 25.00 | 25.00 | 25.00 | 25.00 | 25.00 | 25.00 | 25.00 | 25.00 | 25.00 | 25.00 | 25.00 | 25.00 | |
| Pigment dispersion liquid 2 | | 25.00 | | | | | | | | | | | | | | | | |
| Pigment dispersion liquid 3 | | | 25.00 | | | | | | | | | | | | | | | |
| Pigment dispersion liquid 4 | | | | 25.00 | | | | | | | | | | | | | | |
| Pigment dispersion liquid 5 | | | | | | | | | | | | | | | | | | 25.00 |
| Pigment dispersion liquid 6 | | | | | | | | | | | | | | | | | | |
| Pigment dispersion liquid 7 | | | | | | | | | | | | | | | | | | |
| Monoethanolamine | | | | | | | | | | | | | | | | | | |

TABLE 2-continued

Composition and properties of ink

| | Ink | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Diethanolamine | | | | | | | 0.50 | | | | | | | | | | | |
| Tri-ethanolamine | 0.50 | 0.50 | 0.50 | 0.50 | 0.25 | 0.25 | | | | | | 0.009 | 0.010 | 0.19 | 0.20 | 1.00 | 1.10 | 0.50 |
| Tri-propanolamine | | | | | | | | 0.50 | | | | | | | | | | |
| Acetic acid | | | | | | | | | | | | | | | | | | |
| Succinic acid | | | | | | | | | 0.50 | | | | | | | | | |
| Citric acid | | | | | 0.25 | | | | | 0.50 | | | | | | | | |
| EDTA | | | | | | 0.25 | | | | | 0.50 | | | | | | | |
| Benzenepenta-carboxylic acid | | | | | | | | | | | | | | | | | | |
| Surfactant 1 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Surfactant 2 | | | | | | | | | | | | | | | | | | |
| Surfactant 3 | | | | | | | | | | | | | | | | | | |
| Surfactant 4 | | | | | | | | | | | | | | | | | | |
| Surfactant 5 | | | | | | | | | | | | | | | | | | |
| Surfactant 6 | | | | | | | | | | | | | | | | | | |
| Surfactant 7 | | | | | | | | | | | | | | | | | | |
| Glycerin | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Proxel GXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion exchanged water | 64.20 | 64.20 | 64.20 | 64.20 | 64.20 | 64.20 | 64.20 | 64.20 | 64.20 | 64.20 | 64.20 | 64.691 | 64.690 | 64.51 | 64.50 | 63.70 | 63.60 | 64.20 |
| Chelating agent (%) | 0.50 | 0.50 | 0.50 | 0.50 | 0.50 | 0.50 | 0.50 | 0.50 | 0.50 | 0.50 | 0.50 | 0.009 | 0.010 | 0.19 | 0.20 | 1.00 | 1.10 | 0.50 |
| Trialka-nolamine (%) | 0.50 | 0.50 | 0.50 | 0.50 | 0.25 | 0.25 | 0.00 | 0.50 | 0.00 | 0.00 | 0.00 | 0.009 | 0.010 | 0.19 | 0.20 | 1.00 | 1.10 | 0.50 |
| Specified surfactant (%) | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |

TABLE 3

Composition and properties of ink

| | Ink | | | | | | | | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 |
| Pigment dispersion liquid 1 | | 25.00 | 25.00 | 25.00 | 25.00 | 25.00 | 25.00 | 25.00 | 25.00 | 25.00 | 25.00 | 25.00 | 25.00 | 25.00 | 25.00 | | | |
| Pigment dispersion liquid 2 | | | | | | | | | | | | | | | | | | |
| Pigment dispersion liquid 3 | | | | | | | | | | | | | | | | | | |
| Pigment dispersion liquid 4 | | | | | | | | | | | | | | | | | | |
| Pigment dispersion liquid 5 | | | | | | | | | | | | | | | | | | |
| Pigment dispersion liquid 6 | 25.00 | | | | | | | | | | | | | | | | | |
| Pigment dispersion liquid 7 | | | | | | | | | | | | | | | | 25.00 | 25.00 | 25.00 |
| Monoethanolamine | | | | | | | | | | | | | 0.50 | | | | | |
| Diethanolamine | | | | | | | | | | | | | | | | | | |
| Triethanolamine | | 0.50 | 0.50 | 0.50 | 0.50 | 0.50 | 0.50 | 0.50 | 0.50 | 0.50 | 0.50 | 0.50 | | | | 0.50 | | |
| Tripropanolamine | | | | | | | | | | | | | | | | | | |
| Acetic acid | | | | | | | | | | | | | | 0.50 | | | | |
| Succinic acid | | | | | | | | | | | | | | | | | 0.50 | |
| Citric acid | | | | | | | | | | | | | | | | | | 0.50 |
| EDTA | | | | | | | | | | | | | | | | | | |
| Benzenepenta-carboxylic acid | | | | | | | | | | | | | | | 0.50 | | | |
| Surfactant 1 | 0.10 | | | | | | | 0.04 | 0.05 | 0.40 | 0.41 | 0.10 | 0.10 | 0.10 | 0.10 | 0.10 | 0.10 | 0.10 |
| Surfactant 2 | | 0.10 | | | | | | | | | | | | | | | | |
| Surfactant 3 | | | 0.10 | | | | | | | | | | | | | | | |
| Surfactant 4 | | | | 0.10 | | | | | | | | | | | | | | |
| Surfactant 5 | | | | | 0.10 | | | | | | | | | | | | | |
| Surfactant 6 | | | | | | 0.10 | | | | | | | | | | | | |
| Surfactant 7 | | | | | | | 0.10 | | | | | | | | | | | |

TABLE 3-continued

Composition and properties of ink

| | Ink | | | | | | | | | | | | | | | | | |
|---|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 | 36 |
| Glycerin | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Diethylene glycol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Proxel GXL(S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion exchanged water | 64.20 | 64.20 | 64.20 | 64.20 | 64.20 | 64.20 | 64.20 | 64.26 | 64.25 | 63.90 | 63.89 | 64.70 | 64.20 | 64.20 | 64.20 | 64.20 | 64.20 | 64.70 |
| Chelating agent (%) | 0.50 | 0.50 | 0.50 | 0.50 | 0.50 | 0.50 | 0.50 | 0.50 | 0.50 | 0.50 | 0.50 | 0.00 | 0.50 | 0.50 | 0.50 | 0.50 | 0.50 | 0.00 |
| Trialkanolamine (%) | 0.50 | 0.50 | 0.50 | 0.50 | 0.50 | 0.50 | 0.50 | 0.50 | 0.50 | 0.50 | 0.50 | 0.00 | 0.00 | 0.00 | 0.00 | 0.50 | 0.00 | 0.00 |
| Specified surfactant (%) | 0.10 | 0.10 | 0.10 | 0.00 | 0.00 | 0.00 | 0.00 | 0.04 | 0.05 | 0.40 | 0.41 | 0.10 | 0.10 | 0.10 | 0.10 | 0.10 | 0.10 | 0.10 |

<Manufacture of Recording Head>

A recording head having a constitution as shown in FIG. 2 was manufactured. The second protection layer 107 was composed of each of the following materials: iridium for Recording head 1, ruthenium for Recording head 2 and tantalum for Recording head 3. The recording head was manufactured based on the manufacturing method described in Japanese Patent Application Laid-Open No. 2008-105364.

<Evaluation>

The inks and the recording heads obtained as described above were used in the combination shown in Table 4 and following evaluation was made using an ink jet recording apparatus having the constitution as shown in FIG. 1A and FIG. 1B. In the present Examples, a solid image recorded under the condition in which eight droplets of 4 ng of an ink is applied to a unit region of 1/600 inch×1/600 inch is defined to have a recording duty of 100%. In the invention, AAA, AA, A or B is an acceptable level and C is an unacceptable level in the following evaluation criteria. Evaluation results are shown in Table 4.

(Kogation Removing Property)

The ink flow path of the recording head was filled with an ink. This allowed conduction between the heater-side region 107a of the second protection layer as an anode and the opposite electrode-side region 107b of the second protection layer as a cathode. Under such a state, a drive pulse having a voltage of 20 V and a pulse width of 1.5 μsec was applied to a heating unit 5.0×10⁶ times at frequency of 5 kHz to eject the ink. Then, the recording head was observed under an optical microscope and in all of Examples and Comparative Examples and Reference Examples 4 to 6, adhesion of kogation to the protection layer was confirmed. On the other hand, no kogation was generated in Reference Examples 1 to 3.

Next, a DC voltage of +10 V was applied for 30 seconds to the side of the external electrode 111 connected to the heater-side region 107a of the second protection layer 107 serving as the anode. Then, the recording head was observed under an optical microscope to find the state of kogation which had adhered to the protection layer. The kogation removing property was evaluated based on the following evaluation criteria.

A: No kogation adhered to the protection layer.
C: Kogation adhered to the protection layer.

(Ejection Property After Elution of Protection Layer)

With the recording head after the evaluation of "kogation removing property", a 5 cm×5 cm solid image having a recording duty of 100% was recorded on a recording medium ("Canon Photo Paper Glossy", trade name; product of Canon). As a result, no unevenness was found on a solid image when the kogation removing property was evaluated as A, while unevenness was found on a solid image when the kogation removing property was evaluated as C.

With the recording head which had finished recording of a solid image, an ink was ejected by applying a drive pulse having a voltage of 20 V and a pulse width of 1.5 μsec to a heating unit 2.5×10⁶ times at a frequency of 5 kHz assuming that ejection was repeated after kogation removal. Continuously, for evaluation, a 5 cm×5 cm solid image having a recording duty of 100% was recorded and the resulting image was designated as "Solid image 1".

A cycle of applying a drive pulse 2.5×10⁶ times to a heating unit under conditions similar to those described above to cause ink ejection and then recording a 5 cm×5 cm solid image having a recording duty of 100% was repeated to obtain Solid image 2, Solid image 3 and Solid image 4. The unevenness of Solid images 1 to 4 thus obtained was observed visually and the ejection property was evaluated based on the following evaluation criteria:

AAA: None of Solid images 1 to 4 had unevenness.
AA: None of Solid images 1 to 3 had unevenness, but Solid image 4 had unevenness.
A: Neither Solid image 1 nor 2 had unevenness, but Solid images 3 and 4 had unevenness.
B: Solid image 1 had not unevenness, but Solid images 2 to 4 had unevenness.
C: Any of Solid images 1 to 4 had unevenness.

TABLE 4

Evaluation conditions and evaluation results

| | | Evaluation conditions | | Evaluation results | |
|---|---|---|---|---|---|
| | | | | | Ejection property |
| | | | Recording | Kogation | after elution of |
| | Ink | head | removal | protection layer |
| Example | 1 | 1 | 1 | A | AAA |
| | 2 | 1 | 2 | A | AAA |
| | 3 | 2 | 1 | A | AAA |
| | 4 | 3 | 1 | A | AAA |
| | 5 | 4 | 1 | A | AAA |
| | 6 | 5 | 1 | A | AAA |
| | 7 | 6 | 1 | A | AAA |
| | 8 | 7 | 1 | A | A |
| | 9 | 8 | 1 | A | AAA |
| | 10 | 9 | 1 | A | B |
| | 11 | 10 | 1 | A | B |
| | 12 | 11 | 1 | A | B |
| | 13 | 12 | 1 | A | A |
| | 14 | 13 | 1 | A | AA |
| | 15 | 14 | 1 | A | AA |
| | 16 | 15 | 1 | A | AAA |
| | 17 | 16 | 1 | A | AAA |

TABLE 4-continued

Evaluation conditions and evaluation results

|  |  | Evaluation conditions | | Evaluation results | |
| --- | --- | --- | --- | --- | --- |
|  |  | Ink | Recording head | Kogation removal | Ejection property after elution of protection layer |
|  | 18 | 17 | 1 | A | AA |
|  | 19 | 18 | 1 | A | AAA |
|  | 20 | 19 | 1 | A | AA |
|  | 21 | 20 | 1 | A | AAA |
|  | 22 | 21 | 1 | A | AAA |
|  | 23 | 22 | 1 | A | B |
|  | 24 | 23 | 1 | A | A |
|  | 25 | 24 | 1 | A | A |
|  | 26 | 25 | 1 | A | B |
|  | 27 | 26 | 1 | A | AA |
|  | 28 | 27 | 1 | A | AAA |
|  | 29 | 28 | 1 | A | AAA |
|  | 30 | 29 | 1 | A | AA |
| Comparative Example | 1 | 30 | 1 | A | C |
|  | 2 | 30 | 2 | A | C |
|  | 3 | 31 | 1 | A | C |
|  | 4 | 32 | 1 | A | C |
|  | 5 | 33 | 1 | A | C |
| Reference Example | 1 | 34 | 1 | A | AAA |
|  | 2 | 35 | 1 | A | AAA |
|  | 3 | 36 | 1 | A | AAA |
|  | 4 | 1 | 3 | C | — |
|  | 5 | 10 | 3 | C | — |
|  | 6 | 30 | 3 | C | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-136747, filed Jul. 13, 2017, and Japanese Patent Application No. 2018-113665, filed Jun. 14, 2018, which are hereby incorporated by reference herein in their entirety.

What is claimed is:

1. An ink jet recording method comprising:
    (A) using an ink jet recording apparatus having:
        (a) a recording head equipped with
            (i) a heater placed in an ink flow path that communicates with an ejection orifice,
            (ii) a first protection layer placed at a position corresponding to the heater and blocking a contact between the heater and an ink in the ink flow path, and
            (iii) a second protection layer placed at a position corresponding to the heater and to be brought into contact with the ink and including at least one metal material selected from the group consisting of iridium, ruthenium, and a material containing at least either one of iridium and ruthenium; and
        (b) a unit for causing an electrochemical reaction, with the second protection layer as one electrode and an ink-mediated conduction site as another electrode, to elute at least a portion of the second protection layer in the ink for removal of a kogation; and
    (B) ejecting the ink from the recording head to record an image on a recording medium,
    wherein the ink comprises an aqueous ink comprising a pigment, a resin dispersant for dispersing the pigment, and a chelating agent, which is at least either one of an alkanolamine having two or more hydroxy groups and a polyvalent carboxylic acid compound having two or more to four or less carboxy group.

2. The ink jet recording method according to claim 1, wherein a content (% by mass) of the chelating agent in the ink is 0.01% by mass or more based on the total mass of the ink.

3. The ink jet recording method according to claim 1, wherein the chelating agent comprises an alkanolamine having two or more hydroxy groups.

4. The ink jet recording method according to claim 3, wherein the alkanolamine having two or more hydroxy groups comprises a trialkanolamine.

5. The ink jet recording method according to claim 4, wherein a content (% by mass) of the trialkanolamine in the ink is 0.20% by mass or more to 1.00% by mass or less based on the total mass of the ink.

6. The ink jet recording method according to claim 1, wherein the resin dispersant is a resin having an anionic group.

7. The ink jet recording method according to claim 1, wherein the ink comprises a nonionic surfactant.

8. The ink jet recording method according to claim 7, wherein the nonionic surfactant comprises a fluorine-based nonionic surfactant.

9. The ink jet recording method according to claim 8, wherein a content (% by mass) of the fluorine-based nonionic surfactant in the ink is 0.05% by mass or more to 0.40% by mass or less based on the total mass of the ink.

10. The ink jet recording method according to claim 1, wherein a content (% by mass) of the pigment in the ink is 0.50% by mass or more to 15.00% by mass or less based on the total mass of the ink.

11. The ink jet recording method according to claim 1, wherein a content (% by mass) of the resin dispersant in the ink is 0.10% by mass or more to 20.00% by mass or less based on the total mass of the ink.

12. The ink jet recording method according to claim 1, wherein a mass ratio of the content (% by mass) of the pigment to the content (% by mass) of the resin dispersant is 0.3 or more to 10.0 or less.

13. The ink jet recording method according to claim 1, wherein the resin dispersant is at least one of an acrylic resin and a urethane resin.

14. The ink jet recording method according to claim 1, wherein the resin dispersant is an acrylic resin.

15. The ink jet recording method according to claim 1, wherein the acrylic resin has a hydrophilic unit derived from (meth)acrylic acid and a hydrophobic unit derived from at least one of an aromatic ring-containing monomer and a (meth)acrylate-based monomer.

16. The ink jet recording method according to claim 1, wherein the second protection layer is made of iridium.

17. An ink jet recording apparatus comprising:
    (a) a recording head equipped with
        (i) a heater placed in an ink flow path that communicates with an ejection orifice,
        (ii) a first protection layer placed at a position corresponding to the heater and blocking a contact between the heater and an ink in the ink flow path, and
        (iii) a second protection layer placed at a position corresponding to the heater and to be brought into contact with the ink and including at least one metal material selected from the group consisting of iridium, ruthenium, and a material containing at least either one of iridium and ruthenium; and (b) a unit for causing an electrochemical reaction, with the second protection layer as one electrode and an ink-mediated conduction site as another electrode, to elute at least a portion of the second protection layer in the ink for removal of a kogation,
wherein the ink comprises an aqueous ink comprising a pigment, a resin dispersant for dispersing the pigment, and a chelating agent, which is at least either one of an alkanolamine having two or more hydroxy groups and a polyvalent carboxylic acid compound having two or more to four or less carboxy group.

* * * * *